United States Patent
Suneya

(10) Patent No.: US 8,959,178 B2
(45) Date of Patent: Feb. 17, 2015

(54) TRANSMISSION APPARATUS AND TRANSMISSION METHOD

(71) Applicant: Canon Kabushiki Kaisha, Tokyo (JP)

(72) Inventor: Toru Suneya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/741,110

(22) Filed: Jan. 14, 2013

(65) Prior Publication Data

US 2013/0185391 A1 Jul. 18, 2013

(30) Foreign Application Priority Data

Jan. 17, 2012 (JP) ................................ 2012-007458

(51) Int. Cl.
*G06F 15/16* (2006.01)
*H04L 29/08* (2006.01)
*H04L 29/06* (2006.01)

(52) U.S. Cl.
CPC ................ *H04L 67/02* (2013.01); *H04L 65/00* (2013.01); *H04L 65/1069* (2013.01); *H04L 65/4092* (2013.01); *H04L 65/80* (2013.01)
USPC ........... 709/217; 709/224; 709/227; 370/242; 370/252

(58) Field of Classification Search
CPC ............................ H04L 67/02; H04L 65/4092
USPC ........... 709/200–203, 217–227; 370/242, 252
See application file for complete search history.

(56) References Cited

U.S. PATENT DOCUMENTS

| 7,756,041 | B2 * | 7/2010 | Whitehill et al. | ............. 370/238 |
| 8,064,331 | B2 * | 11/2011 | Tanaka et al. | ................. 370/216 |
| 8,542,600 | B2 * | 9/2013 | Kawabata et al. | ............ 370/242 |
| 2007/0190998 | A1 * | 8/2007 | Tanaka et al. | ................. 455/423 |

FOREIGN PATENT DOCUMENTS

| JP | 2005-318414 A | 11/2005 |
| JP | 2011-211390 A | 10/2011 |

\* cited by examiner

*Primary Examiner* — Moustafa M Meky
(74) *Attorney, Agent, or Firm* — Canon U.S.A., Inc. IP Division

(57) ABSTRACT

A transmission apparatus for transmitting content data to a receiving apparatus includes an establishing unit configured to establish a state where the content data can be transmitted to the receiving apparatus, a reception unit configured to receive a transmission request of the content data from the receiving apparatus in the established state where the content data can be transmitted, and a control unit configured to perform control such that, while a number of transmissions of the content data is equal to or greater than a predetermined number, the control unit does not transmit the content data to the receiving apparatus having issued the transmission request but keeps the state where the content data can be transmitted to the receiving apparatus and, when the number of transmissions of the content data becomes less than the predetermined number, the control unit permits the content data to be transmitted to the receiving apparatus.

15 Claims, 9 Drawing Sheets

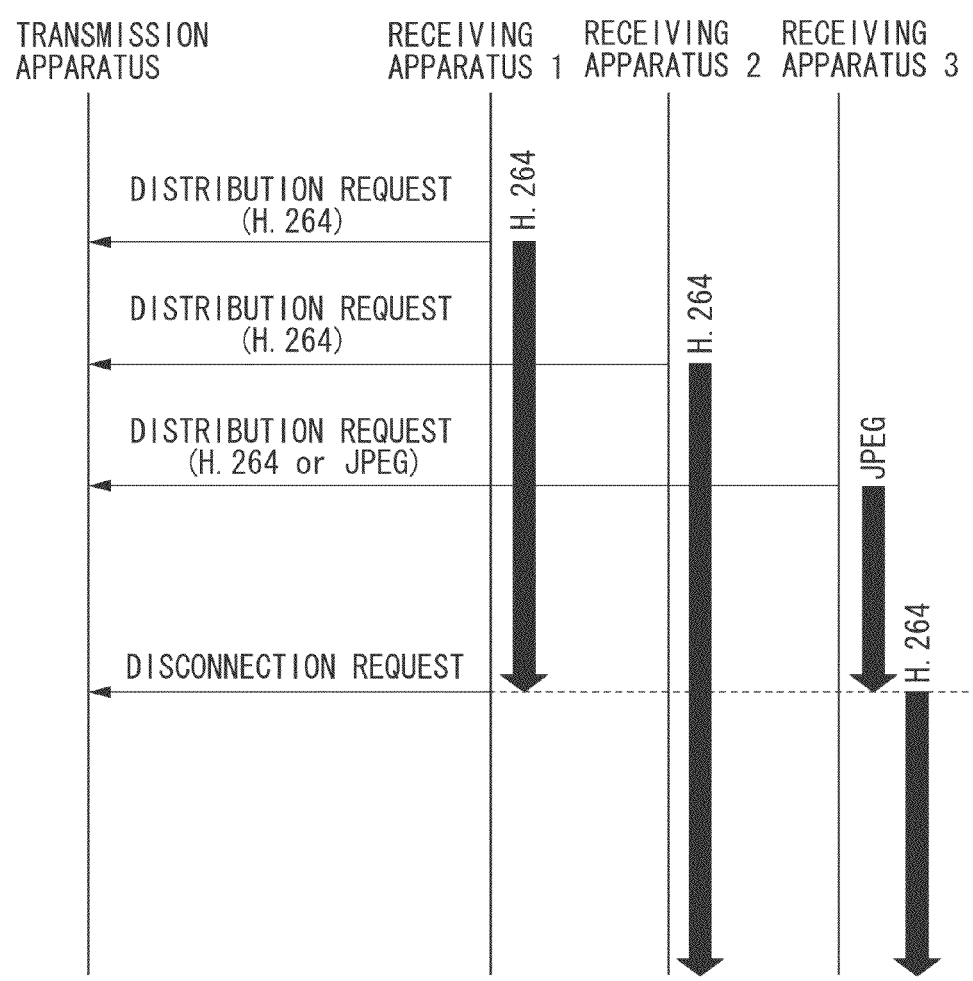

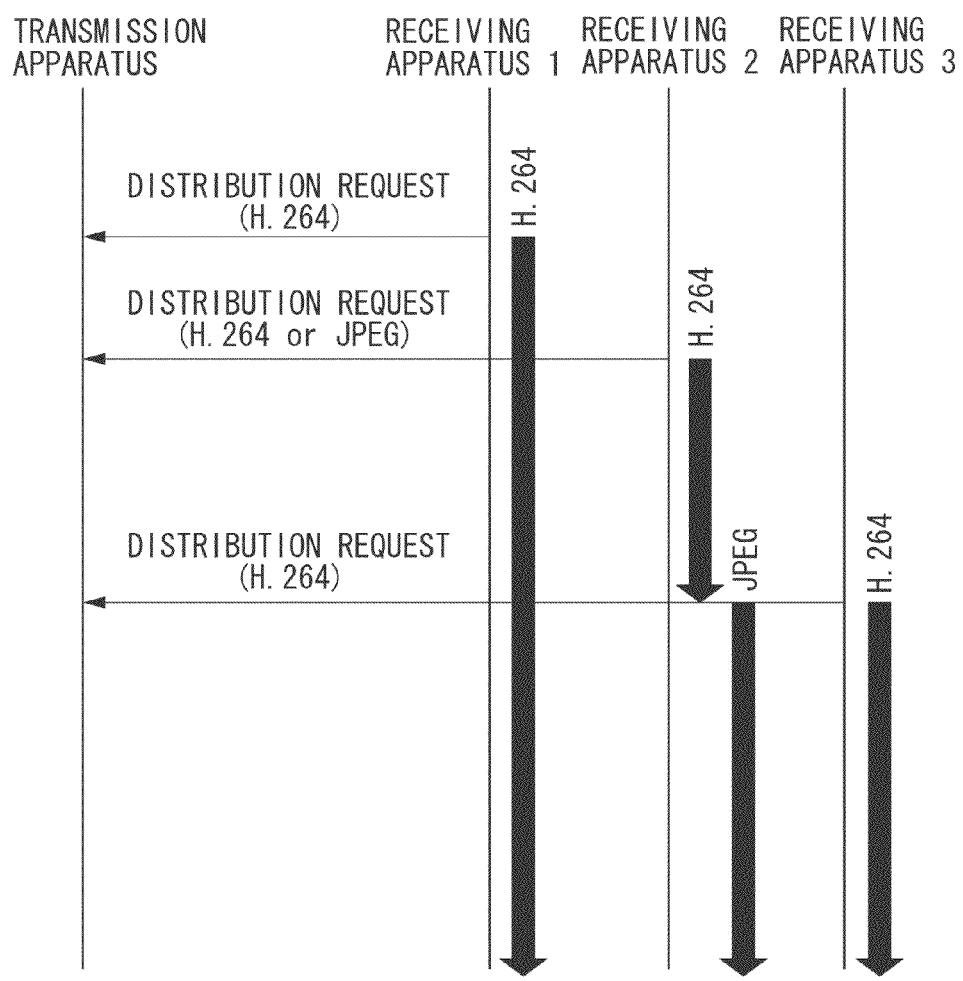

TRANSMISSION APPARATUS AND TRANSMISSION METHOD

BACKGROUND OF THE INVENTION

1. Field of the Invention

The present invention relates to a transmission apparatus and a transmission method, and more specifically, to a technology capable of transmitting data more equally and efficiently in a case where the number of data distributions is limited.

2. Description of the Related Art

Recently, there has been utilized a technology in which multimedia data such as video and audio is streamed via an IP network in order to view the video and listen to the audio. More specifically, when distributing the multimedia data that requires real-time distribution, e.g., live video, a communication protocol, which is referred to as Real-time Transport Protocol (RTP), is generally used.

RTP is a protocol for transferring data, e.g., mainly audio and video, in real time and is defined as RFC3550 by Internet Engineering Task Force (IETF). RTP is an upper protocol of User Datagram Protocol (UDP), which is a non-connection type protocol. In a case where video or audio data is packetized by using RTP for communication, the RTP packet that streams through a network is generally referred to as stream data or a media stream.

Generally, Real Time Streaming Protocol (RTSP) is used as a protocol for controlling a communication session such as a start and an end of a media stream by using RTP. RTSP is defined as RFC 2326 by IETF. Japanese Patent Application Laid-open No. 2011-211390 discusses a technology for controlling a session by using RTSP and Session Initiation Protocol (SIP).

A server that conducts session control by using RTSP may sometimes limit the number of sessions connectable at a time. The number of sessions connectable at a time is limited because of, for example, an issue of a resource of the server which distributes stream data and an issue of a communication band of a network. In a case where the number of sessions by RTSP is limited by the server, a client's connection request, which is made after the number of sessions reaches the limit, is rejected by the server. In other words, a mechanism like a reservation system for a connection request is not present in communication control according to RTSP. Therefore, in an environment where the number of sessions is limited, a client who can access the server is generally determined on a first-come-first-served basis.

Generally, at a point of time when the client's connection request is rejected by the server, a session by RTSP between the server and the client who made the rejected request is to be disconnected. Therefore, the client cannot know the subsequent state of the server. Under the circumstance, however, if the number of sessions by RTSP falls below the upper limit number because of any change of the situation, the client who desires to establish a connection by RTSP can access the server if the client makes the connection request at that timing.

However, a client not actually in connection with the server cannot know the state of the server in real time. Therefore, in order to confirm whether the client can connect to the server, in some cases, the client may waste time in attempting to connect to the server many times or may miss a right timing to connect to the server.

SUMMARY OF THE INVENTION

The present invention is directed to a transmission apparatus that avoids attempting a useless connection to improve equality in distributing stream data.

According to an aspect of the present invention, a transmission apparatus for transmitting content data to a receiving apparatus via a network includes an establishing unit configured to establish a state where the content data is able to be transmitted to the receiving apparatus via the network, a reception unit configured to receive a transmission request of the content data from the receiving apparatus in the established state where the content data is able to be transmitted to the receiving apparatus, and a control unit configured to perform control such that, while a number of transmissions of the content data being transmitted is equal to or greater than a predetermined number, the control unit does not transmit the content data to the receiving apparatus having issued the transmission request but keeps the state where the content data is able to be transmitted to the receiving apparatus and, when the number of transmissions of the content data becomes less than the predetermined number, the control unit permits the content data to be transmitted to the receiving apparatus having issued the transmission request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example with a receiving apparatus capable of receiving content data in a plurality of video coding formats according to the second exemplary embodiment.

FIG. 9 illustrates another example with a receiving apparatus capable of receiving a plurality of video coding formats according to the second exemplary embodiment.

DESCRIPTION OF THE EMBODIMENTS

Various exemplary embodiments, features, and aspects of the invention will be described in detail below with reference to the drawings.

A configuration of a computer apparatus constituting a transmission apparatus according to the present exemplary embodiment of the present invention is described below with reference to a block diagram in FIG. 1. The transmission apparatus and a receiving apparatus may be realized with an independent single computer or may be realized with a plurality of computer apparatuses having different functions shared therebetween as required. In a case where the transmission apparatus and the receiving apparatus includes the plurality of computer apparatuses, the plurality of computer apparatuses are connected to each other via a local area network (LAN) so as to be able to communicate with each other.

Figure 1:
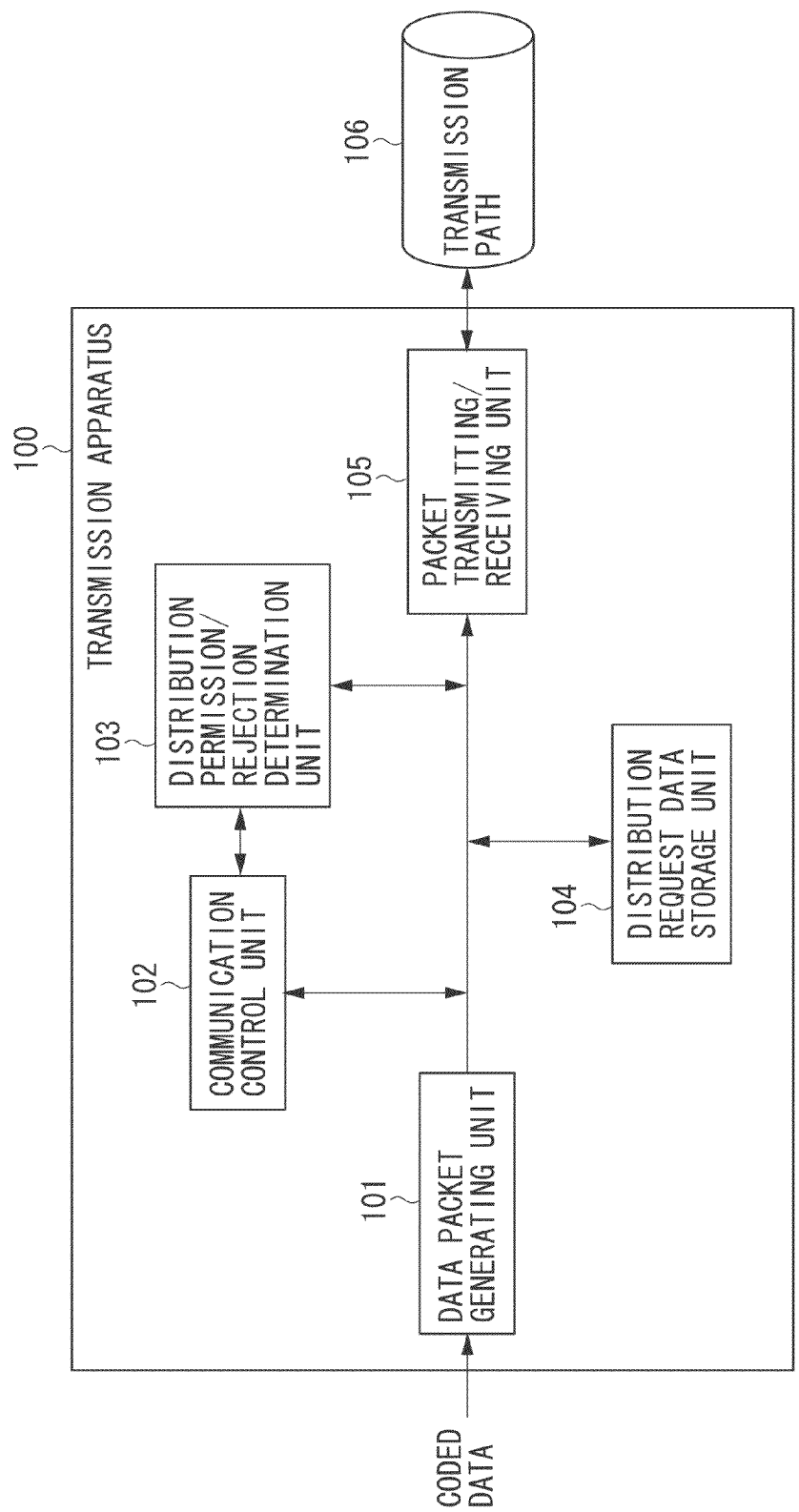
FIG. 1 is a block diagram illustrating an example of a configuration of a transmission apparatus according to a first exemplary embodiment of the present invention.

In FIG. 1, a transmission apparatus 100 includes a data packet generating unit 101, a communication control unit 102, a distribution permission/rejection determination unit 103, a distribution request data storage unit 104, and a packet transmitting/receiving unit 105.

In a case where the data packet generating unit 101 establishes communication by using, for example, a RTP protocol, encoded data of video and audio input from an external device is divided into a size optimum for communication. Further, a header necessary for the communication is added to the divided encoded data to packetize the data, thereby generating a data packet in RTP.

The communication control unit 102 performs control for permitting or rejecting a new connection with a receiving apparatus according to an instruction from the distribution permission/rejection determination unit 103.

The distribution permission/rejection determination unit 103 manages, for example, the number of receiving apparatuses to which the transmission apparatus 100 can distribute the data packet at a time. When the distribution permission/rejection determination unit 103 receives a new data distribution request from the receiving apparatus, the distribution permission/rejection determination unit 103 determines whether to permit/reject the data distribution to the receiving apparatus.

In a case where the distribution permission/rejection determination unit 103 rejects the distribution request, the distribution request data storage unit 104 temporary stores information of thus rejected distribution request.

The packet transmitting/receiving unit 105 transmits the data packet generated by the data packet generating unit 101 to the receiving apparatus according to a determination result of the distribution permission/rejection determination unit 103. The packet transmitting/receiving unit 105 receives a transmission request (hereinafter referred to as "distribution request") of content data constituting the content from the receiving apparatus for which a connection is permitted by the communication control unit 102.

Figure 2:
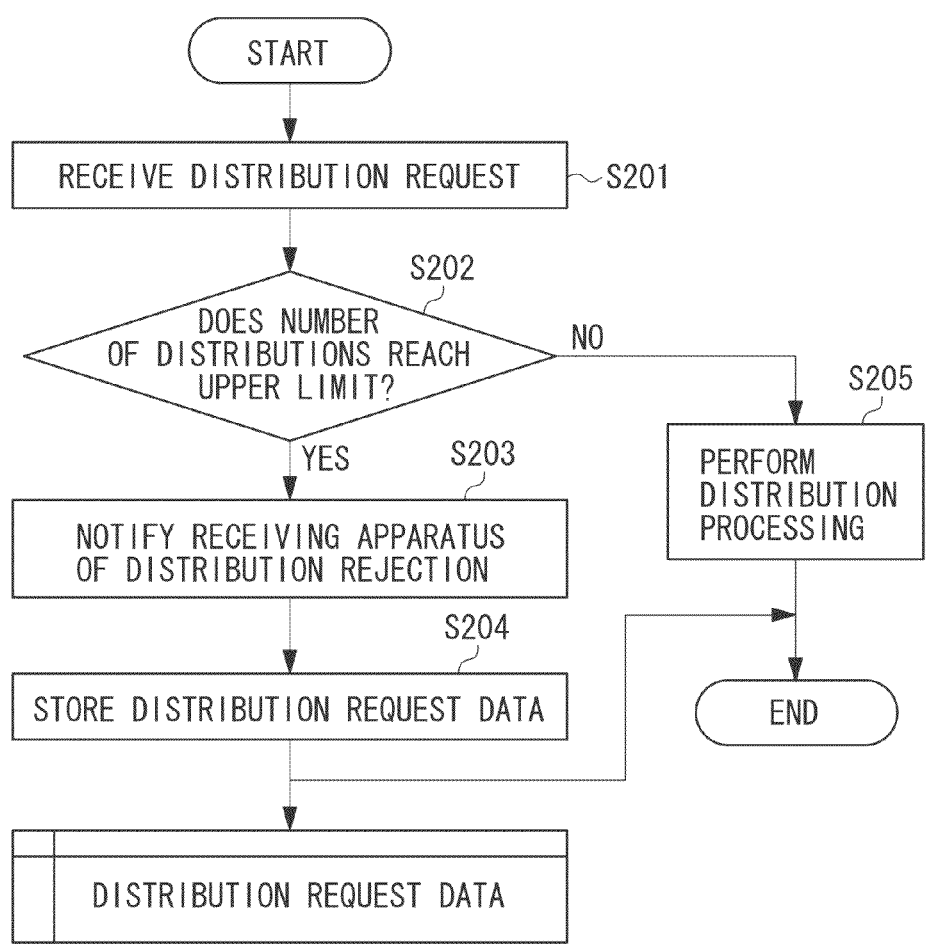
FIG. 2 is a flow chart illustrating an example of a content of processing performed when a distribution request is received according to the first exemplary embodiment.
Figure 3:
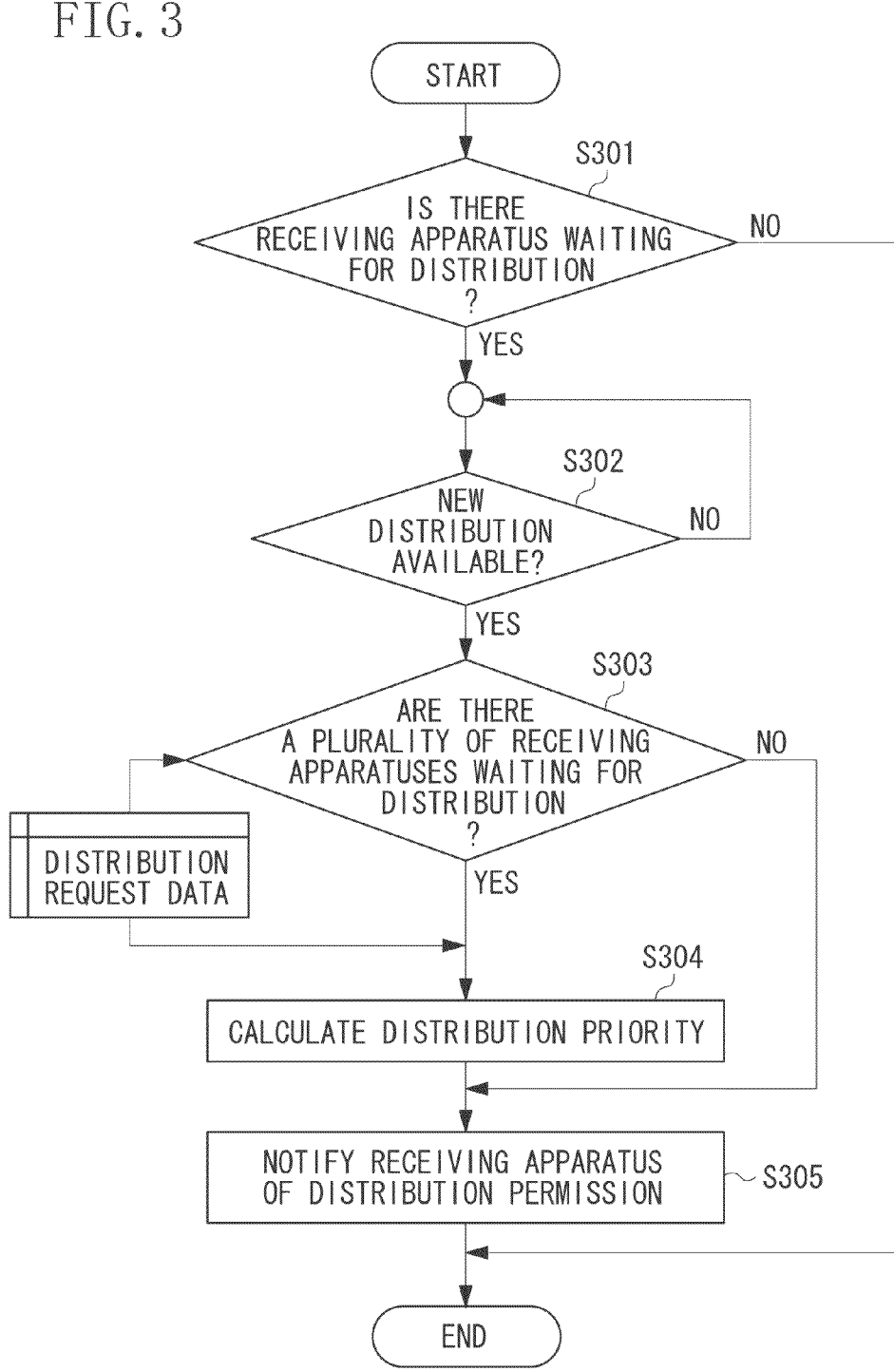
FIG. 3 is a flow chart illustrating an example of a content of processing performed when a new distribution becomes available according to the first exemplary embodiment.

A distribution control conducted by the transmission apparatus 100 of the present exemplary embodiment is described below in detail with reference to FIGS. 2 and 3. FIGS. 2 and 3 are flow charts each illustrating an example of the distribution control conducted by the transmission apparatus 100 according to the present exemplary embodiment. FIG. 2 illustrates an example of a processing operation when the distribution request is received from the receiving apparatus. FIG. 3 illustrates an example of a processing operation in a case where a new distribution becomes available after the processing in FIG. 2.

In step S201, as illustrated in FIG. 2, the transmission apparatus 100 receives the distribution request from the receiving apparatus. In step S202, the distribution permission/rejection determination unit 103 determines whether the number of distributions reaches an upper limit. As a result of the determination of step S202, in a case where the number of distributions does not reach the upper limit (NO in step S202), the processing proceeds to step S205 where the distribution permission/rejection determination unit 103 permits the distribution and the communication control unit 102 performs distribution processing based on the distribution permission.

On the other hand, as a result of the determination of step S202, in a case where the number of distributions reaches the upper limit (YES in step S202), the processing proceeds to step S203 where the distribution permission/rejection determination unit 103 determines to reject the distribution and notifies the receiving apparatus of the rejection of the distribution request. In the present exemplary embodiment, the receiving apparatus of which distribution request has been rejected from the transmission apparatus 100 is to be a state of waiting for permission of the distribution request.

In step S204, the distribution permission/rejection determination unit 103 stores information of the rejected distribution request in the distribution request data storage unit 104 as distribution request data. The distribution request data contains, for example, an internet protocol (IP) address of the receiving apparatus which issued the distribution request and information of the requested content.

A processing operation performed after the distribution is rejected in the flow chart illustrated in FIG. 2 is described below with reference to FIG. 3. In step S301, the distribution permission/rejection determination unit 103 refers to the distribution request data storage unit 104 to determine whether there is a receiving apparatus waiting for distribution. In a case where there is the receiving apparatus waiting for distribution (YES in step S301), the processing proceeds to step S302. In a case where there is no receiving apparatus waiting for distribution (NO in step S301), the processing is ended.

In step S302, distribution permission/rejection determination unit 103 waits until a new distribution becomes available and, in a case where the new distribution becomes available because of a decrease of the number of distributions (YES in step S302), the processing proceeds to step S303. In step S303, the distribution permission/rejection determination unit 103 determines whether there is a plurality of receiving apparatuses waiting for distribution with reference to the distribution request data. As a result of the determination, in a case where there is a plurality of receiving apparatuses waiting for distribution (YES in step S303), the processing proceeds to step S304. In a case where there is not the plurality of receiving apparatus waiting for distribution (NO in step S303), the processing proceeds to step S305. In step S304, priority of distribution to the plurality of receiving apparatuses is calculated.

In step S305, based on the distribution priority, the communication control unit 102 provides a notification for permitting the distribution to the receiving apparatus waiting for distribution. The receiving apparatus which has received the notification for permitting the distribution issues a distribution request again to the transmission apparatus 100 to receive the content.

Figure 4:
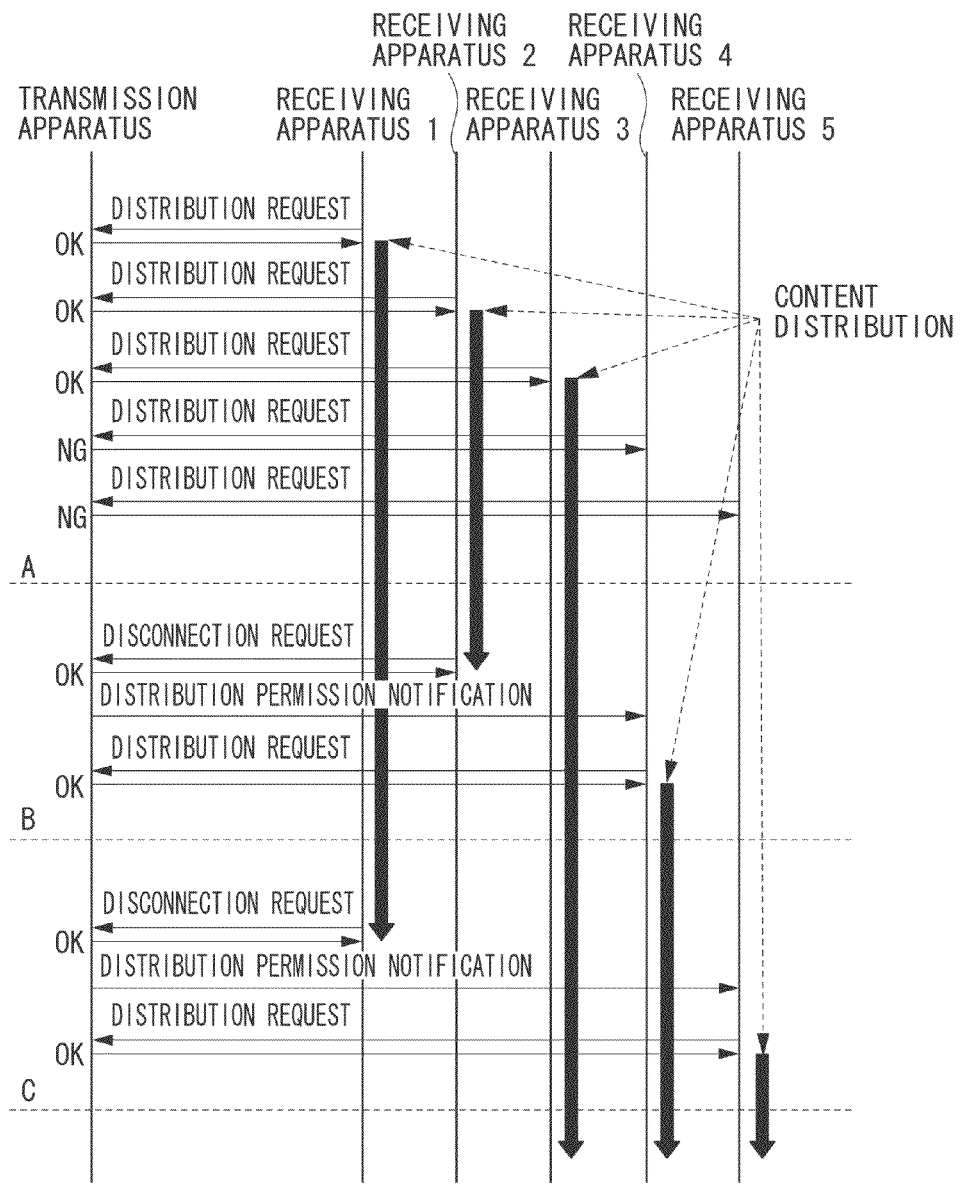
FIG. 4 illustrates an example of content distribution processing according to the first exemplary embodiment.

An example of a flow of processing described with reference to FIGS. 2 and 3 is described below with reference to FIG. 4. FIG. 4 illustrates an example of processing in a case where the maximum number of distributions of content is 3 and the number of receiving apparatuses is 5. In FIG. 4, each of the receiving apparatuses 1 through 5 sequentially issues a distribution request to the transmission apparatus 100. However, since the maximum number of distributions is 3, the distribution requests from the receiving apparatuses 4 and 5 are rejected and, at a timing A, content distributions to the receiving apparatuses 1 through 3 are performed.

When the receiving apparatus 2 which has been receiving the content requests the disconnection of a session, the transmission apparatus 100 disconnects the session to stop the content distribution to the receiving apparatus 2, and at the same time, the transmission apparatus 100 provides the receiving apparatus 4 of which distribution request has been rejected with a notification of distribution permission. The receiving apparatus 4 which has received the notification issues a distribution request again to the transmission apparatus 100 to receive the content.

At the timing B in FIG. 4, instead of the receiving apparatus 2 to which the distribution has been stopped, the receiving apparatus 4 receives the content. Processing between the timing B and a timing C, as similar to the processing between the timing A and the timing B, the receiving apparatus 5 receives the content instead of the receiving apparatus 1 which was receiving the content. In the example in FIG. 4, provided that there is no difference of priority between the receiving apparatus 4 and the receiving apparatus 5 which are in a state of waiting for distribution at the timing A, the transmission apparatus 100 simply provides, based on a first-come-first-served basis, the receiving apparatus 4 which issued the distribution request earlier than the receiving apparatus 5 with the notification of the distribution permission.

Figure 5:
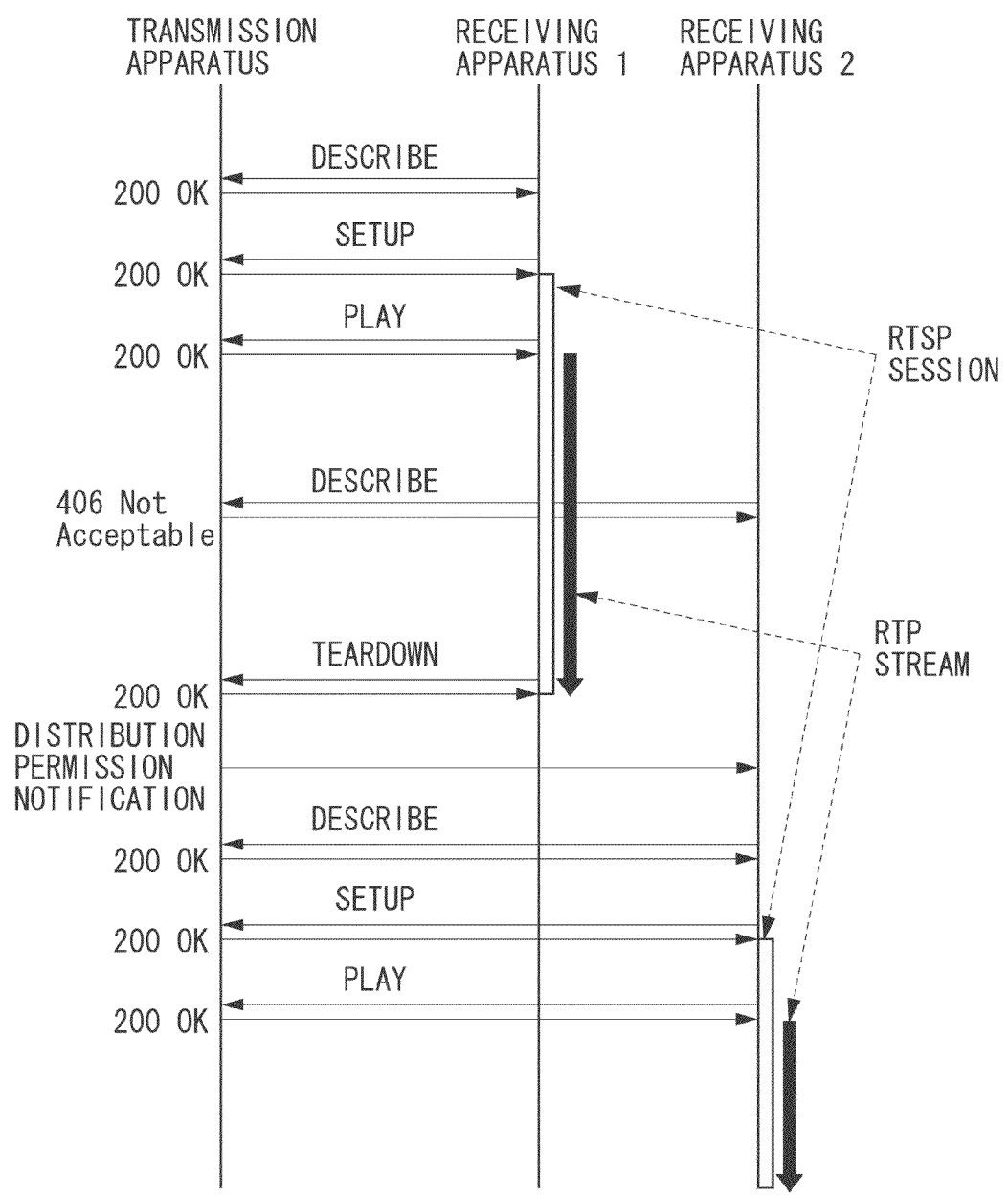
FIG. 5 illustrates an example in a case where RTP and RTSP are used as protocols according to the first exemplary embodiment.

An example of a case where RTP and RTSP protocols are used is described with reference to FIGS. 5 and 6. FIG. 5 is a first example of a case where RTP and RTSP are used. In FIG. 5, for the sake of an easy understanding of a flow of the control, the number of receiving apparatuses waiting for receiving the content from the transmission apparatus 100 at one time is to be 1.

The RTSP is a protocol for controlling a transmission of the content such as a start and an end of the media stream. The method for conducting the control of the communication session is not limited to the method in which the RTSP is used. In FIG. 5, the receiving apparatus 1 generates a session of the RTSP according to a DESCRIBE method and a SETUP method with the RTSP. Subsequently, a content distribution from the transmission apparatus 100 is started according to a PLAY method, i.e., a distribution of the RTP stream. At the time, the transmission apparatus 100 which receives a request for session information according to the DESCRIBE method with the RTSP from the other receiving apparatus 2 returns an error notification to the receiving apparatus 2 (as indicated by "406 Not Acceptable" in the example in FIG. 5) since the transmission apparatus 100 cannot distribute the content to two receiving apparatuses at the same time.

The receiving apparatus 2 after receiving the error notification from the transmission apparatus 100 is put into a state of waiting for the distribution permission from the transmission apparatus 100. Therefore, a connection of the RTSP is maintained. Then, in a case where the receiving apparatus 1 issues a request to stop the content distribution according to, for example, a TEARDOWN method with the RTSP, the transmission apparatus 100 immediately stops the content distribution to the receiving apparatus 1. Subsequently, the transmission apparatus 100 notifies the receiving apparatus 2 of the content distribution permission distribution.

In a case where the distribution permission notification is transmitted by using the RTSP, since the RFC2326 which defines the RTSP does not include any applicable method, an ANNOUNCE, an OPTIONS, a REDIRECT, or the like is used as a method available from a side of the transmission apparatus 100 to a side of the receiving apparatus. The receiving apparatus 2 which has received the distribution permission notification uses the methods from the DESCRIBE to the PLAY to start the content distribution.

The distribution permission notification may be provided to the receiving apparatus 2 by any method, so that it is not essential to use the RTSP method here. A method for providing the distribution permission notification other than the RTSP method may be a method in which a communication port by which the receiving apparatus receives the distribution permission notification is prepared and the transmission apparatus 100 transmits the distribution permission notification to the port. In addition to the above method, a method in which information to the effect that the transmission apparatus 100 can perform the content distribution is written into a file, which can be referred to by both of the transmission apparatus 100 and the receiving apparatus, can also produce an effect of the present exemplary embodiment.

Another example using the protocols of RTP and RTSP is described below with reference to FIG. 6. FIG. 6 illustrates a second example of a case where RTP and RTSP protocols are used. For the sake of easy understanding of the flow of the control, as similar to the case in FIG. 5, the number of the receiving apparatuses waiting for receiving the content from the transmission apparatus 100 at the same time is limited to 1, also in FIG. 6.

Figure 6:
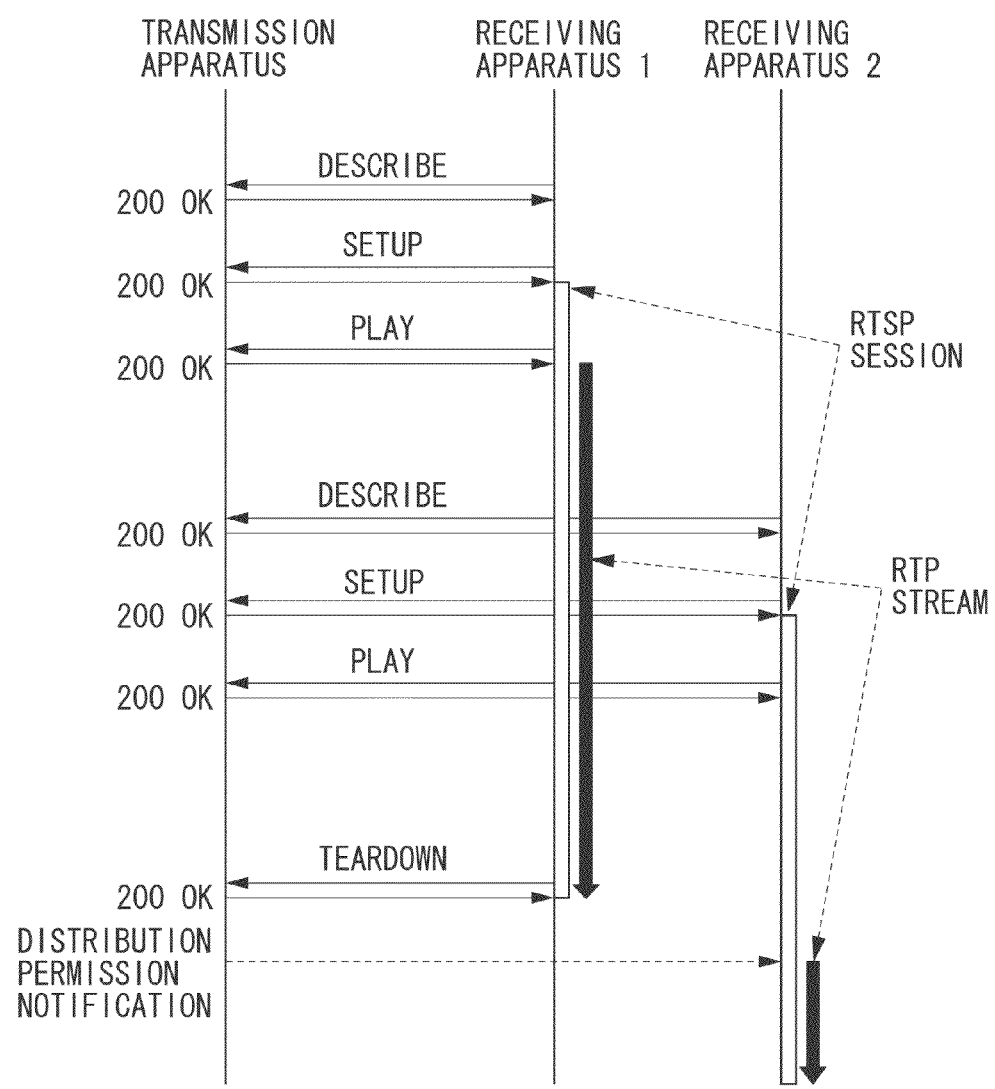
FIG. 6 illustrates another example in a case where RTP and RTSP are used as protocols according to the first exemplary embodiment.

In FIG. 6, processing performed until the receiving apparatus 1 receives the content is similar to that in FIG. 5.

Different from the case in FIG. 5, the transmission apparatus 100 does not return the error notification to the receiving apparatus 1 when the transmission apparatus 100 receives the distribution request according to the RTSP method from the receiving apparatus 2 during the content distribution to the receiving apparatus 1.

However, in FIG. 6, the content distribution to the receiving apparatus 2 is actually started after the distribution to the receiving apparatus 1 is stopped. In the case in FIG. 6, the distribution permission notification may be provided to the receiving apparatus 2 or may be omitted.

In the present exemplary embodiment, the receiving apparatus in which the content distribution is once rejected needs to wait for the distribution permission notification from the transmission apparatus 100. The waiting time thereof can be designated. In a case where the waiting time is set, the transmission apparatus 100 provides the distribution permission notification, only when the content distribution becomes newly available within the set period of time, to the receiving apparatus sequentially in the order of priority. The priority order can be stored in, for example, the distribution request data storage unit 104. The waiting time may be designated from the receiving apparatus or may be designated from the transmission apparatus 100. In a case where, after providing the distribution permission notification to the receiving apparatus, any reaction is not received from the receiving apparatus for a certain period of time (e.g., in a case where the transmission request of the content data is not received from the receiving apparatus), the transmission apparatus 100 may provide the distribution permission notification to the other receiving apparatus.

As described above, the transmission apparatus 100 performs control such that, while the number of transmissions of content data being transmitted is equal to or greater than a predetermined number, when the number of transmissions of the content data becomes less than the predetermined number within a predetermined period of time after receiving the transmission request, the transmission apparatus 100 permits the content data to be transmitted to the receiving apparatus which has issued the transmission request. The transmission apparatus 100 further performs control such that, while the number of transmissions of the content data being transmitted is equal to or greater than the predetermined number, when the number of transmissions of the content data does not become less than the predetermined number within the predetermined period of time after receiving the transmission request, the transmission apparatus 100 does not transmit the content data to the receiving apparatus which has issued the transmission request.

Furthermore, the transmission apparatus 100 performs control such that, while the number of transmissions of the content data being transmitted is equal to or greater than the predetermined number, if a plurality of receiving apparatuses issues transmission requests, the transmission apparatus 100 permits the content data to be transmitted to the plurality of receiving apparatus sequentially in the order of priority when the number of transmissions of the content data becomes less than the predetermined number.

The distribution permission/rejection determination unit 103 of the transmission apparatus 100 determines permission/rejection of the data distribution based on a communication band and a bit rate of the requested media. The communication band can be measured by, for example, a packet loss rate and a round trip time. The distribution permission/rejection determination unit 103 can determine a predetermined number that the transmission apparatus 100 can distribute the content (i.e., an upper limit of the number of distributions) according to at least one of the communication band and the bit rate of media. The distribution permission/rejection determination unit 103 determines the permission/rejection of the data distribution based on the predetermined number.

A second exemplary embodiment of the present invention is described mainly about a difference from the first exemplary embodiment. In the above described first exemplary embodiment, a case where one type of the media contained in the content to be distributed is one is described.

Figure 7:
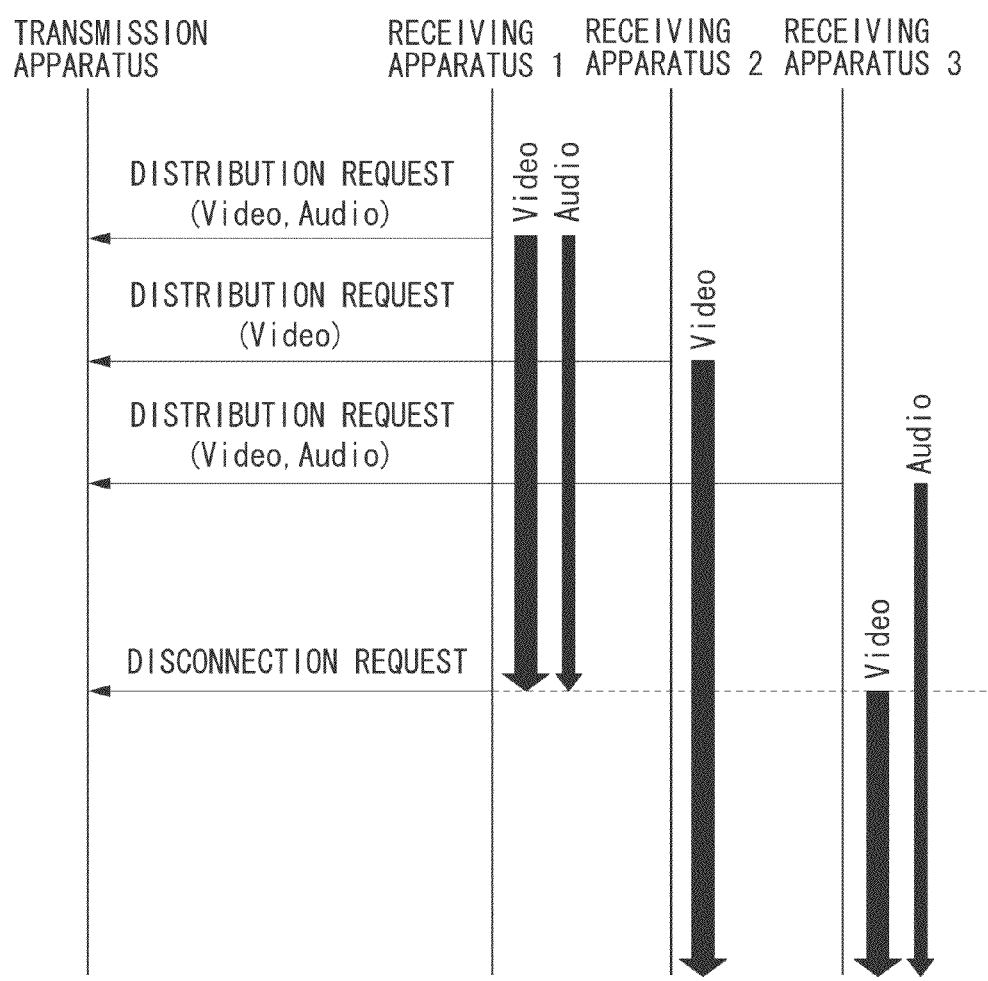
FIG. 7 illustrates an example in a case where video and audio are distributed according to a second exemplary embodiment of the present invention.

In the present exemplary embodiment, a case where a plurality of media is contained in the content is described. FIG. 7 illustrates an example of a flow of a control in a case where two kinds of media such as video and audio are contained in the distributable content.

In FIG. 7, each of two media such as video and audio can be distributed up to two sessions. The transmission apparatus 100 firstly starts distribution of the both media of video and audio in response to the distribution requests of video and audio from the receiving apparatus 1.

Secondary, the transmission apparatus 100 starts distribution of video in response to the distribution request of video from the receiving apparatus 2. In a case where the distribution requests of video and audio are received from the receiving apparatus 3, since video has already been distributed to two sessions, i.e., to the receiving apparatus 1 and the receiving apparatus 2, the transmission apparatus 100 starts distribution of audio only, which is distributable at the time.

In a case where the receiving apparatus 1 requests for disconnection of the session, the transmission apparatus 100 stops distribution of video and audio to the receiving apparatus 1. Accordingly, a video distribution newly becomes available, and the video distribution to the receiving apparatus 3 which was once rejected can be started.

In a case where transmission requests of first content data (e.g., video) constituting the content and second content data (e.g., audio) constituting the content are received, the transmission apparatus 100 can conduct the following control.

While the number of transmissions of first content data being transmitted is equal to or greater than a first predetermined number, the transmission apparatus 100 does not transmit the first content data to the receiving apparatus which has issued the transmission request. At that time, the transmission apparatus 100 keeps a state where the first content data is able to be transmitted to the receiving apparatus. The transmission apparatus 100 further performs control such that, when the number of transmissions of the first content data becomes less than the first predetermined number, the transmission apparatus 100 permits the first content data to be transmitted to the receiving apparatus.

While the number of transmissions of second content data being transmitted is equal to or greater than a second predetermined number, the transmission apparatus 100 does not transmit the second content data to the receiving apparatus which has issued the transmission request. At that time, the transmission apparatus 100 keeps a state where the second content data is able to be transmitted to the receiving apparatus. The transmission apparatus 100 performs control such that, when the number of transmissions of the second content data becomes less than the second predetermined number, the transmission apparatus 100 permits the second content data to be transmitted to the receiving apparatus.

There are several distribution control methods in a case where the receiving apparatus desires to receive a plurality of media distributions at the same time. In a first method, the media which become distributable are distributed sequentially irrespective of the type of media. The method is illustrated in FIG. 7 as an example of the present exemplary embodiment. Ina second method, the transmission apparatus 100 starts distribution of the media after all the desired media become distributable. In a third method, the distribution is started from a distributable media at a time when a specific media becomes distributable.

A difference between the second method and the method described with reference to FIG. 7 exists in the timing of starting distribution of audio to the receiving apparatus 3. In the second method, the receiving apparatus 3 in FIG. 7 starts distributing video and audio together at a timing when the distribution of video and audio to the receiving apparatus 1 is stopped.

A specific example of the third method may include a case that, if the specific media is, for example, video, the transmission apparatus 100 does not start the distribution of the media before video as the specific media becomes distributable even when the other media to be received together with video become distributable.

The third method may be combined with the first method. For example, if the specific media is video and the video is distributable, the transmission apparatus 100 starts distributing video first and, at a timing when the other media become distributable, the transmission apparatus 100 starts distributing the other media sequentially.

As described above, in a case where the receiving apparatus, which has issued the transmission request, requests transmissions of the first content data (e.g., video) constituting the content and the second content data (e.g., the Audio) constituting the content, the transmission apparatus 100 can conduct the following control. In a case where the number of transmissions of the first content data becomes less than the first predetermined number and the number of transmissions of the second content data becomes less than the second predetermined number, the transmission apparatus 100 can permit the first content data and the second content data to be transmitted to the receiving apparatus. Alternatively, when the number of transmissions of the first content data becomes less than the first predetermined number, the transmission apparatus 100 permits the first content data to be transmitted to the receiving apparatus, and when the number of transmissions of the second content data becomes less than the second predetermined number, the transmission apparatus 100 permits the second content data to be transmitted to the receiving apparatus.

A method for designating a media substitutable with the specific media among the media of which distribution is requested is described below. FIG. 8 illustrates an example of processing in a case that video coding formats include a Joint Photographic Experts Group (JPEG) format and an H.264 format, and there is provided a receiving apparatus in which media in the JPEG format and media in the H.264 format are substitutable with each other.

In FIG. 8, the content in the H.264 format can be distributed up to two sessions. Both of the receiving apparatus 1 and the receiving apparatus 2 request the content distribution in H.264 and start to receive the content in the H.264 format immediately after requesting the distribution thereof. Thereafter, the receiving apparatus 3 request the distribution content in the H.264 or the JPEG format. However, since the receiving apparatus 1 and the receiving apparatus 2 are receiving the content in the H.264 format at the moment, the receiving apparatus 3 starts receiving the content in the JPEG format.

When the receiving apparatus 1 requests the disconnection of the session, the transmission apparatus 100 disconnects the session to the receiving apparatus 1, stops the distribution of the content in the H.264 format, and switch the format of the content transmitted to the receiving apparatus 3 from JPEG to H.264.

Switching the format of the content transmitted to the receiving apparatus 3 can be realized such that the receiving apparatus 3 transfers the priority order between the substitutable media types to the transmission apparatus 100. Alternatively, switching the format of the content can arbitrarily be performed according to the intention of the transmission apparatus 100. In a case where the contents distributed by using the RTSP is shifted, a method such as the ANNOUNCE method is to be used is described in the RFC2326.

As described above, in a case where the content data to which the transmission request is issued can be encoded according to a first coding method and a second coding method, the following processing can be performed. While the number of transmissions of the first content data encoded according to the first coding method is equal to or greater than the first predetermined number, and the number of transmissions of the second content data encoded according to the second coding method is equal to or greater than the second predetermined number, the transmission apparatus 100 does not transmit the first content data or the second content data. The transmission apparatus 100 keeps a state where the first content data and the second content data are able to be transmitted to the receiving apparatus. In a case where the number of transmissions of the content data encoded according to the first coding method becomes less than the first predetermined number, the transmission apparatus 100 permits the content data encoded according to the first coding method to be transmitted to the receiving apparatus. In a case where the number of transmissions of the content data encoded according to the second coding method becomes less than the second predetermined number, the transmission apparatus 100 permits the content data encoded according to the second coding method to be transmitted to the receiving apparatus.

Another case of switching between the media types of the content distributed from the transmission apparatus 100 is described below with reference to FIG. 9. FIG. 9 illustrates another example of the processing in a case that video coding formats include the JPEG format and H.264 format, and there is provided a receiving apparatus in which media in the JPEG format and media in the H.264 format are substitutable with each other. In FIG. 9, similar to the case in FIG. 8, the content in the H.264 format can be distributed up to two sessions.

The receiving apparatus 1 requests the distribution in the H.264 format to the transmission apparatus 100 and receives the content in the H.264 format. The receiving apparatus 2 requests the distribution of the content in one of the H.264 or the JPEG format as the substitutable media and starts receiving the content in the H.264 format.

Then, the receiving apparatus 3 requests the distribution of the content in the H.264 format. However, at the time, the transmission apparatus 100 is distributing the content in the H.264 format to the receiving apparatus 1 and the receiving apparatus 2. Therefore, the transmission apparatus 100 switches the media type of the content distributed to the receiving apparatus 2 from H.264 to JPEG, and starts distributing the content in the H.264 format to the receiving apparatus 3.

As described above, in a case where the content data to which the transmission request is issued can be encoded according to the first coding method (e.g., H.264) and the second coding method (e.g., JPEG), the following processing can be performed. While transmitting the content data encoded according to the first coding method to the first receiving apparatus which has issued the transmission request, the transmission apparatus 100 receives the transmission request of the content data encoded according to the first coding method from the second receiving apparatus 2. Then, the transmission apparatus 100 performs control to permit the content data encoded according to the second coding method to be transmitted to the first receiving apparatus.

The example in FIG. 9 illustrates a state that the transmission apparatus 100 obtains the information about the types of the substitutable media for each receiving apparatus, and switches between formats of the content that has already been distributing. This can avoid the restriction from the maximum number of distributions by type of media, and the content can be distributed to a greater number of receiving apparatus.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-007458 filed Jan. 17, 2012, which is hereby incorporated by reference herein in its entirety.

What is claimed is:

1. A transmission apparatus for transmitting content data to a receiving apparatus via a network, the transmission apparatus comprising:

an establishing unit configured to establish a state where the content data is able to be transmitted to the receiving apparatus via the network;

a reception unit configured to receive a transmission request of the content data from the receiving apparatus in the established state where the content data is able to be transmitted to the receiving apparatus; and a control unit configured to perform control such that, while a number of transmissions of the content data being transmitted is equal to or greater than a predetermined number, the control unit does not transmit the content data to the receiving apparatus having issued the transmission request but keeps the state where the content data is able to be transmitted to the receiving apparatus and, when the number of transmissions of the content data becomes less than the predetermined number, the control unit permits the content data to be transmitted to the receiving apparatus having issued the transmission request.

2. The transmission apparatus according to claim 1, wherein the control unit performs control such that, while the number of transmissions of the content data being transmitted is equal to or greater than the predetermined number, when the number of transmissions of the content data becomes less than the predetermined number within a predetermined period of time after receiving the transmission request, the control unit permits the content data to be transmitted to the receiving apparatus having issued the transmission request and, while the number of transmissions of the content data being transmitted is equal to or greater than the predetermined number, when the number of transmissions of the content data does not become less than the predetermined number within the predetermined period of time after receiving the transmission request, the control unit does not transmit the content data to the receiving apparatus having issued the transmission request.

3. The transmission apparatus according to claim 1, wherein the control unit performs control such that, in a case where the receiving apparatus having issued the transmission request requests transmissions of first content data and second content data, the control unit does not transmit the first content data to the receiving apparatus having issued the transmission request while the number of transmissions of the first content data being transmitted is equal to or greater than a first predetermined number, but keeps a state where the first content data is able to be transmitted to the receiving apparatus, and the control unit permits the first content data to be transmitted to the receiving apparatus when the number of transmissions of the first content data becomes less than the first predetermined number, and the control unit does not transmit the second content data to the receiving apparatus having issued the transmission request while the number of transmissions of the second content data being transmitted is equal to or greater than a second predetermined number, but keeps a state where the second content data is able to be transmitted to the receiving apparatus and, when the number of transmissions of the second content data becomes less than the second predetermined number, the control unit permits the second content data to be transmitted to the receiving apparatus.

4. The transmission apparatus according to claim 1, wherein the control unit performs control such that, in a case where the receiving apparatus having issued the transmission request requests transmissions of first content data and second content data, while the number of transmissions of the first content data being transmitted is equal to or greater than a first predetermined number or the number of transmissions of the second content data being transmitted is equal to or greater than a second predetermined number, the control unit does not transmit the first content data or the second content data to the receiving apparatus having issued the transmission request but keeps a state where the first content data and the second content data are able to be transmitted to the receiving apparatus and, when the number of transmissions of the first content data becomes less than the first predetermined number and the number of transmissions of the second content data becomes less than the second predetermined number, the control unit permits the first content data and the second content data to be transmitted to the receiving apparatus.

5. The transmission apparatus according to claim 1, wherein the control unit performs control such that, in a case where the receiving apparatus having issued the transmission request requests transmissions of first content data and second content data, while the number of transmissions of the first content data being transmitted is equal to or greater than a first predetermined number and the number of transmissions of the second content data being transmitted is equal to or greater than a second predetermined number, the control unit does not transmit the first content data or the second content data to the receiving apparatus having issued the transmission request but keeps a state where the first content data and the second content data are able to be transmitted to the receiving apparatus and, when the number of transmissions of the first content data becomes less than the first predetermined number, the control unit permits the first content data to be transmitted to the receiving apparatus and, when the number of transmissions of the second content data becomes less than the second predetermined number, the control unit permits the second content data to be transmitted to the receiving apparatus.

6. The transmission apparatus according to claim 1, wherein the control unit performs control such that, in a case where the content data to which the transmission request is issued is able to be encoded according to a first coding method and a second coding method, while the number of transmissions of first content data encoded according to the first coding method is equal to or greater than a first predetermined number and the number of transmissions of second content data encoded according to the second coding method is equal to or greater than a second predetermined number, the control unit does not transmit the first content data or the second content data to the receiving apparatus having issued the transmission request but keeps a state where the first content data and the second content data are able to be transmitted to the receiving apparatus and, when the number of transmissions of the first content data encoded according to the first coding method becomes less than the first predetermined number, the control unit permits the first content data to be transmitted to the receiving apparatus and, when the number of transmissions of the second content data encoded according to the second coding method becomes less than the second predetermined number, the control unit permits the second content data to be transmitted to the receiving apparatus.

7. The transmission apparatus according to claim 1, wherein the control unit performs control such that, in a case where the content data to which the transmission request is issued is able to be encoded according to a first coding method and a second coding method, while the number of transmissions of the content data encoded according to the first coding method to a first receiving apparatus having issued the transmission request is equal to or greater than the predetermined number, if a transmission request of the content data encoded according to the first coding method is received from a second receiving apparatus, the control unit permits the content data encoded according to the second coding method to be transmitted to the first receiving apparatus.

8. The transmission apparatus according to claim 1, further comprising:
a storing unit configured to store a priority order of a plurality of receiving apparatuses;

wherein the control unit performs control such that, while the number of transmissions of the content data being transmitted is equal to or greater than the predetermined number, the control unit does not transmit the content data to the plurality of receiving apparatuses having issued the transmission requests but keeps the state where the content data is able to transmitted to the plurality of receiving apparatuses and, when the number of transmissions of the content data becomes less than the predetermined number, the control unit permits the content data to be transmitted to the plurality of receiving apparatuses according to the priority order.

9. The transmission apparatus according to claim 1, wherein the control unit performs control such that a transmission permission notification indicating that the transmission of the content data is made available is transmitted to the receiving apparatus to which the control unit permits the content data to be transmitted.

10. The transmission apparatus according to claim 1, wherein the control unit performs control such that, a transmission permission notification indicating that the transmission of the content data is made available is transmitted to the receiving apparatus to which the control unit permits the content data to be transmitted and, if no transmission request is received from a third receiving apparatus within a predetermined period of time after the transmission permission notification is transmitted to the third receiving apparatus, the transmission permission notification is transmitted to a fourth receiving apparatus different from the third receiving apparatus.

11. The transmission apparatus according to claim 1, wherein the control unit performs control to determine the predetermined number based on a communication band of the network and a bit rate of the content data to which the transmission request has been issued.

12. A method for transmitting content data to a receiving apparatus via a network, the method comprising:
    establishing a state where the content data is able to be transmitted to the receiving apparatus via the network;
    receiving a transmission request of the content data from the receiving apparatus in the established state where the content data is able to be transmitted to the receiving apparatus via the network; and
    controlling such that, while a number of transmissions of the content data being transmitted is equal to or greater than a predetermined number, the content data is not transmitted to the receiving apparatus having issued the transmission request but the state where the content data is able to be transmitted to the receiving apparatus is kept and, when the number of transmissions of the content data becomes less than the predetermined number, the content data is permitted to be transmitted to the receiving apparatus having issued the transmission request.

13. The method according to claim 12, further comprising:
    controlling such that, in a case where the receiving apparatus having issued the transmission request requests transmissions of first content data and second content data, while the number of transmissions of the first content data being transmitted is equal to or greater than a first predetermined number, the first content data is not transmitted to the receiving apparatus having issued the transmission request but a state where the first content data is able to be transmitted to the receiving apparatus is kept, and the first content data is permitted to be transmitted to the receiving apparatus when the number of transmissions of the first content data becomes less than the first predetermined number, and, while the number of transmissions of the second content data being transmitted is equal to or greater than a second predetermined number, the second content data is not transmitted to the receiving apparatus having issued the transmission request but a state where the second content data is able to be transmitted to the receiving apparatus is kept, and the second content data is permitted to be transmitted to the receiving apparatus when the number of transmissions of the second content data becomes less than the second predetermined number.

14. A non-transitory computer-readable storage medium storing computer-executable instructions that cause a computer for transmitting content data to a receiving apparatus via a network to execute a method, the method comprising:
    establishing a state where the content data is able to transmitted to the receiving apparatus via the network;
    receiving a transmission request of the content data from the receiving apparatus in the established state where the content data is able to be transmitted to the receiving apparatus via the network;
    controlling such that, while a number of transmissions of the content data being transmitted is equal to or greater than a predetermined number, the content data is not transmitted to the receiving apparatus having issued the transmission request but a state where the content data is able to be streamed to the receiving apparatus is kept and, when the number of transmissions of the content data becomes less than the predetermined number, the content data is permitted to be transmitted to the receiving apparatus having issued the transmission request.

15. The non-transitory computer-readable storage medium according to claim 14, the method further comprising:
    controlling such that, in a case where the receiving apparatus having issued the transmission request requests transmissions of first content data and second content data, while the number of transmissions of the first content data being transmitted is equal to or greater than a first predetermined number, the first content data is not transmitted to the receiving apparatus having issued the transmission request but a state where the first content data is able to be transmitted to the receiving apparatus is kept, and the first content data is permitted to be transmitted to the receiving apparatus when the number of transmissions of the first content data becomes less than the first predetermined number, and, while the number of transmissions of the second content data being transmitted is equal to or greater than a second predetermined number, the second content data is not transmitted to the receiving apparatus having issued the transmission request but a state where the second content data is able to be transmitted to the receiving apparatus is kept, and the second content data is permitted to be transmitted to the receiving apparatus when the number of transmissions of the second content data becomes less than the second predetermined number.

* * * * *